April 24, 1951     A. C. ROBINSON     2,550,203
SAFETY HOOD CATCH FOR VEHICLES

Filed July 7, 1948     2 Sheets-Sheet 1

Alton C. Robinson
INVENTOR.

BY *Clarence A. O'Brien
and Harvey B. Jackson*
Attorneys

April 24, 1951  A. C. ROBINSON  2,550,203
SAFETY HOOD CATCH FOR VEHICLES
Filed July 7, 1948  2 Sheets-Sheet 2
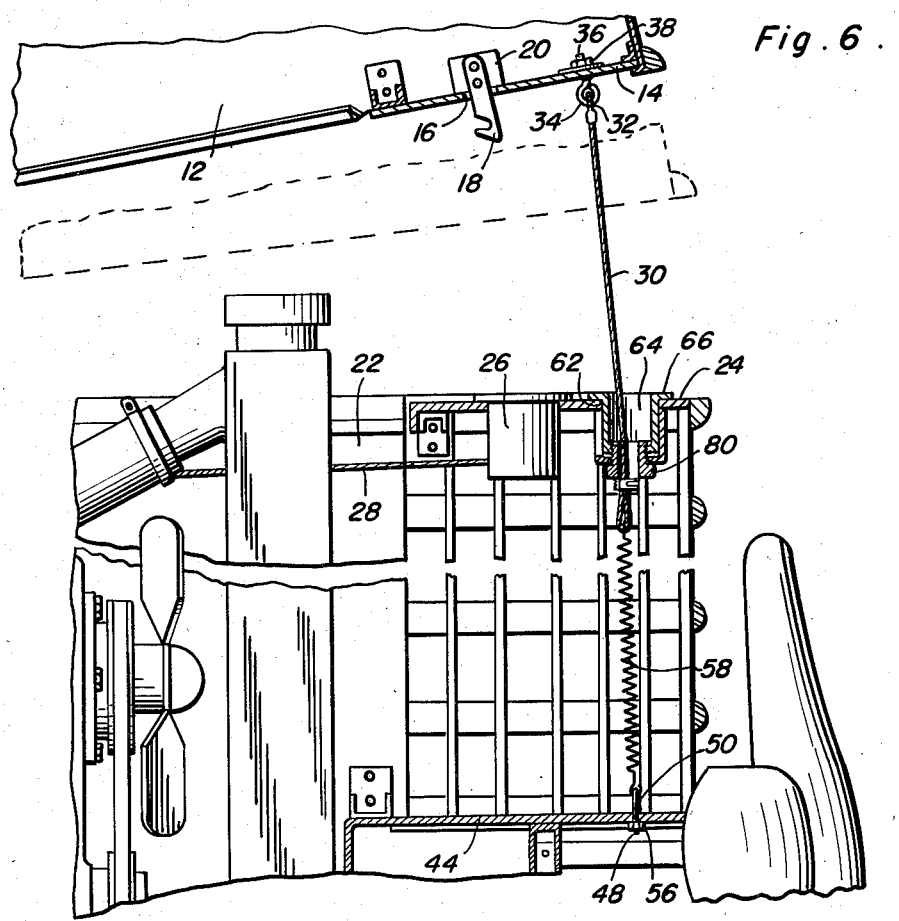
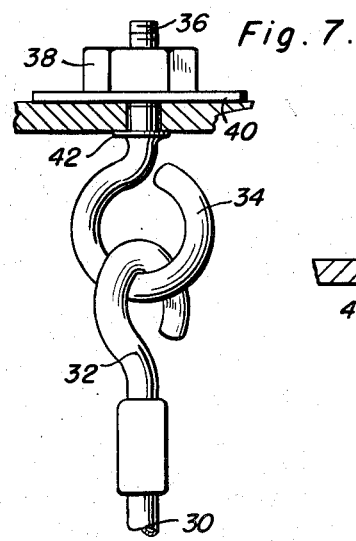
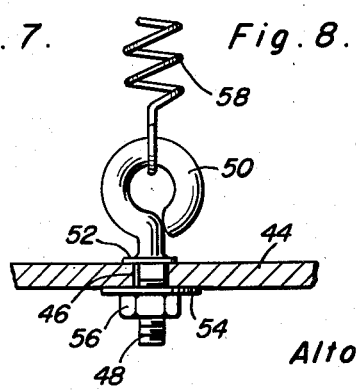
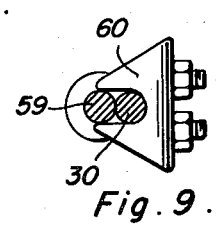
Alton C. Robinson
INVENTOR.

Patented Apr. 24, 1951

2,550,203

UNITED STATES PATENT OFFICE 2,550,203

SAFETY HOOD CATCH FOR VEHICLES

Alton C. Robinson, Hereford, Tex.

Application July 7, 1948, Serial No. 37,449

3 Claims. (Cl. 292—262)

This invention relates to new and useful improvements in safety hood catches for vehicles and the primary object of the present invention is to provide a novel and improved resilient connector between the hood portion of a vehicle and the motor compartment thereof that will limit and cushion the upward opening movement of the hood relative to the said motor compartment.

Another important object of the present invention is to provide an attachment for vehicles and more particularly a resilient means between the hood of a vehicle and the motor compartment thereof, that is adjustable to retain the said hood in a partially opened position for an efficient cooling of the motor compartment and the motor disposed therein.

A further object of the present invention is to provide an auxiliary locking mechanism between the raisable hood of a vehicle and the motor compartment thereof that will cushion and limit the opening movement of the said hood, such attachment being so constructed as to permit the same to be quickly and readily applied to or removed from the hood portion of a vehicle in a convenient manner.

A still further aim of the present invention is to provide a safety hood catch that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 6 is a fragmentary longitudinal vertical sectional view of the forward end of a vehicle, and showing the present invention applied thereto for retaining the hood in a partially open position;

Figure 7 is an enlarged, elevational view showing the manner in which the flexible element used in conjunction with the present invention is applied to the lower wall of a hood;

Figure 8 is an enlarged longitudinal vertical sectional view showing the manner in which the resilient member is anchored to the lower wall of the motor compartment; and, Figure 9 is a horizontal sectional view taken substantially in the direction of arrow numbered 9 in Figure 5, and illustrating the means whereby the free end of the flexible element is adjustably secured to itself.

Figure 2:
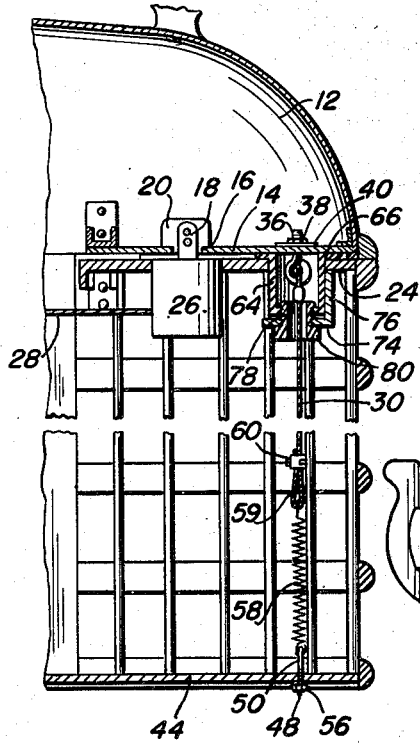
Figure 2 is an enlarged longitudinal vertical sectional view of the forward portion of a vehicle, and showing the present invention applied thereto, and the hood in a completely closed position.
Figure 1:
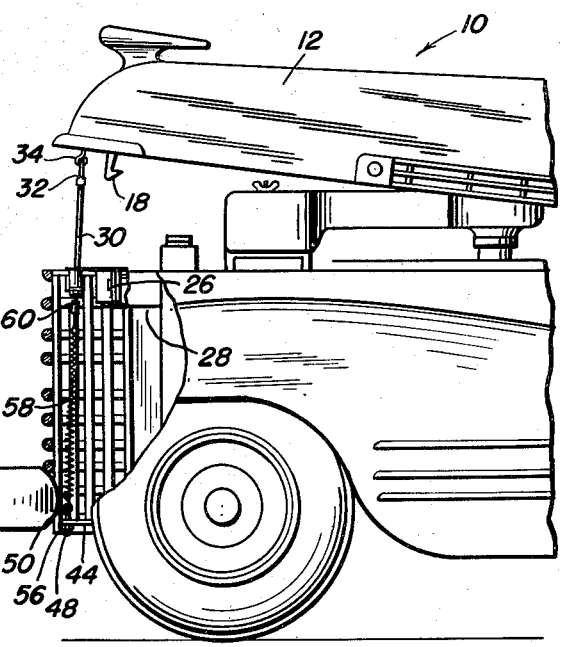
Figure 1 is a fragmentary side elevational view of a vehicle, showing the present invention operatively applied thereto, the hood of the vehicle in a partially open position, and with parts of the vehicle broken away for the convenience of explanation.
Figure 3:
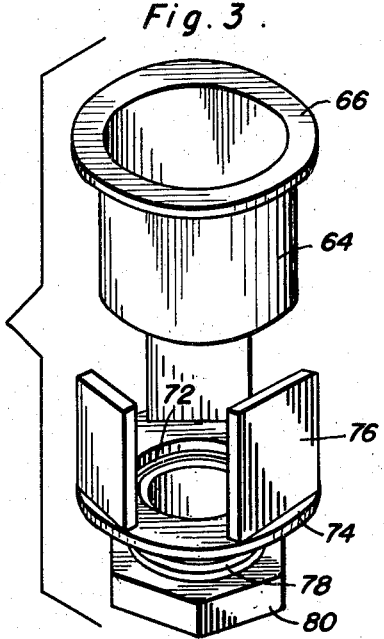
Figure 3 is a group perspective view of the guide and supporting members used in conjunction with the present invention.
Figure 4:
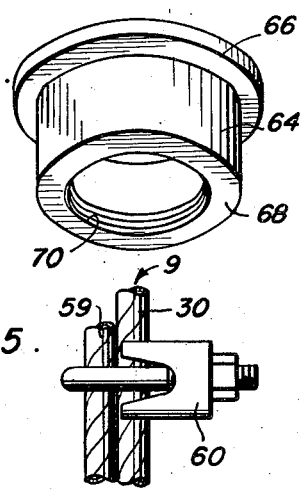
Figure 4 is a perspective view of the supporting sleeve used in conjunction with the present invention.
Figure 5:
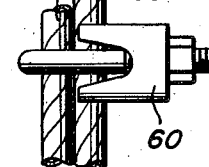
Figure 5 is an enlarged fragmentary, elevational view showing the manner in which the free end of the flexible member is held to itself.

Referring now to the drawings in detail, wherein for the purpose of illustration, there is disclosed a preferred embodiment of the present invention, the numeral 10 represents a vehicle generally having an upwardly raisable, pivotal hood 12 that includes a lower wall 14 which is apertured as at 16 to pivotally engage a locking arm or dog 18 that is supported by a block or bracket 20.

The hood 12 normally closes the motor compartment 22 of the vehicle 10, and the said motor compartment includes an upper support plate or a locking plate 24 that supports a locking mechanism 26 which lockably engages the dog 18 when the hood 12 is disposed in a closed position. This locking mechanism 26 is actuated to an unlocked position or a position for disengaging the dog 18 by an operating rod or flexible element 28 that extends to a position relative to the dashboard or panel (not shown) of the vehicle 10.

The present invention does not attempt to claim the above conventional and known structure, but is merely an attachment therefor that will limit and cushion the upward opening movement of the hood 12.

To accomplish the above desired results, there is provided an elongated flexible element 30, such as a cable or cord, the upper terminal of which is provided with a hook 32.

The hook 32 engages a further hook or loop 34 that is provided with an externally threaded shank portion 36 which extends through a suitable aperture provided in the wall 14, and a nut 38 receivably engaged on the shank 36 bears upon a washer or plate 40 that engages the upper face of the wall 14, with the annular shoulder 42 integrally formed with the shank 36 engaging the lower face of the wall 14 to clampingly retain the hook 34 supporting relative to the hook 12.

The compartment 22 is provided, as usual, with a bottom wall 44 having an aperture 46 that engages the externally threaded shank portion 48 of a further hook or eye member 50. Shank 48 of this latest hook member 50 is provided with an integral shoulder 52 that bears upon the upper face of the wall 44 and a washer 54 slidably carried by the shank 48 bears upon the lower face of the wall 44 by the adjustment of a nut 56 receivably engaged on the shank 48.

One terminal hook of an elongated resilient member or coil spring 58 is anchored to the eye member 50, and the remaining terminal hook of the member 58 is engaged by the free terminal 59 of the element 30 which is secured to itself by a cable clamp 60 that will also function as a stop in a manner which will presently be described.

Extending through an aperture 62 provided in the locking plate 24, is a cylinder or supporting sleeve 64 having an annular flanged portion 66 that bears upon the locking plate 24 to support the sleeve 64 relative thereto. The lower end of the sleeve 64 is provided with an integral plate 68 having an internally threaded opening 70 that registers with an internally threaded opening 72 provided in a holding plate 74.

A plurality of spacer arms or lugs 76 are fixed by welding or the like to the plate 74 and bear against the lower face of the plate 24.

Receivably engaging the openings 70 and 72, is an externally threaded sleeve or guide member 78 having a centrally apertured head portion 80 that bears against the plate 74 to retain the sleeve 64 supported against movement relative to the locking plate 24.

In practical use of the present invention, the clamp 60 is adjusted to limit the upward pivotal movement of the hood 12.

When the rod 28 is actuated to release the dog 18 from the locking mechanism 26, the hood 12 will be urged to a normally raised position by resilient means (not shown). The flexible element 30 and resilient member 58 will determine the amount of pivotal movement of the hood 12 relative to the motor compartment 22.

It should be noted, that the cable clamp 60 will engage the head portion 80 of the guide 78 to limit the sliding movement of the flexible element 30 and thus determine the limited pivotal movement for the head 12.

Frequently during the use of a vehicle, the motor mounted in the compartment 22 will become overheated, therefore, by providing the present invention the hood 12 may be retained in a partially open position so that a passage of air may enter the compartment 22 to effectively cool the motor therein. Further, should the locking mechanism 26 become inoperative the present invention will function to prevent the said hood 12 from pivoting to a fully open position and thus permit the vehicle to be used by an operator.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. Means for limiting and cushioning the opening movement of a vehicle hood comprising, an elongated flexible element, means securing one end of said element to a vehicle hood, a support plate adapted to be mounted in the motor compartment of a vehicle and beneath a hood, a sleeve carried by said support plate for receiving said securing means when the hood on which the securing means is mounted is disposed in a closed position, a guide carried by said sleeve slidably receiving said flexible element, an elongated resilient member having anchoring means at one end adapted for attachment to a portion of a vehicle, and means adjustably securing the free end of said flexible element to the free end of said member.

2. The combination of claim 1 wherein said last mentioned means includes a clamp engageable with said guide to limit the upward sliding movement of said element.

3. Means for cushioning and limiting the opening movement of a swingable closure comprising upper and lower elongated members each having an upper end and a lower end, means adjustably securing the lower end of the upper member to the upper end of the lower member, one of said members comprising a spring, means adapted to secure the upper end of the upper member to a closure, additional means carried by the lower end of the lower member for attaching the lower member to a supporting structure, a supporting plate, a plurality of circumferentially spaced arms rising from said plate, a sleeve embraced by said arms and supported on said plate, and a guide member extending through said plate and threaded in said sleeve for holding the sleeve against the plate, said guide member and said sleeve slidably receiving said upper member, and said means adjustably securing the lower end of the upper member to the upper end of the lower member underlying said guide member and being too large to pass through said guide member.

ALTON C. ROBINSON.

REFERENCES CITED

The following references are of record in the file of this patent:

UNITED STATES PATENTS

| Number | Name | Date |
|---|---|---|
| 523,736 | Cazin | July 31, 1894 |
| 1,326,841 | Bousquet | Dec. 30, 1919 |
| 1,988,049 | Reiner | Jan. 15, 1935 |
| 2,062,020 | Engel | Nov. 24, 1936 |
| 2,211,367 | Davey et al | Aug. 13, 1940 |